United States Patent
Box et al.

(10) Patent No.: US 11,919,220 B2
(45) Date of Patent: Mar. 5, 2024

(54) DEFECTIVE WEB IDENTIFICATION SYSTEM AND METHOD

(71) Applicant: Inteplast Group Corporation, Livingston, NJ (US)

(72) Inventors: Brett Box, Stockdale, TX (US); Collin Lansdale, San Marcos, TX (US); Trevor Luckemeyer, New Braunfels, TX (US); Alan Mosley, New Braunfels, TX (US); William D. Santana, New Braunfels, TX (US); Clayton Crosby, New Braunfels, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 0 days.

(21) Appl. No.: 17/723,637

(22) Filed: Apr. 19, 2022

(65) Prior Publication Data
US 2023/0330908 A1 Oct. 19, 2023

(51) Int. Cl.
*B29C 48/92* (2019.01)
*B29C 48/08* (2019.01)
*B29C 48/28* (2019.01)
*B29L 5/00* (2006.01)

(52) U.S. Cl.
CPC .............. *B29C 48/92* (2019.02); *B29C 48/08* (2019.02); *B29C 48/28* (2019.02); *B29C 2948/92295* (2019.02); *B29L 2005/00* (2013.01)

(58) Field of Classification Search
CPC ...................... B29C 48/08; B29C 2948/92295
USPC .................................................. 425/135–155
See application file for complete search history.

(56) References Cited

U.S. PATENT DOCUMENTS

| 8,517,714 B2 * | 8/2013 | Matsumoto | ............. B29B 7/488 425/367 |
| 2020/0001513 A1 * | 1/2020 | Jones | .................... G01N 21/896 |

OTHER PUBLICATIONS

Website, https://www.providentgrp.com, "Defect Flagging Equipment and Materials," Atak Interactive, published at least as early as Apr. 18, 2021, 6 pages.

* cited by examiner

*Primary Examiner* — Seyed Masoud Malekzadeh
*Assistant Examiner* — Timothy G Hemingway
(74) *Attorney, Agent, or Firm* — Stinson LLP

(57) ABSTRACT

Systems and methods of indicating to a line worker when there is a defective zipper profile extruded onto a generally flat plastic web while moving in a feed direction in a re-sealable container production line. The system includes a sensor for detecting the defective zipper profile and a web distortion device that actuates in response to the sensor detecting the defect. The web distortion device keeps the web bunched together while it spools onto a roll support device located downstream thereby making it readily apparent to a line worker that the bunched segment contains the defective segment.

17 Claims, 5 Drawing Sheets

DEFECTIVE WEB IDENTIFICATION SYSTEM AND METHOD

FIELD

The present disclosure generally relates to producing re-sealable containers, and particularly to producing re-sealable plastic bags.

BACKGROUND

During production of re-sealable plastic bags a zipper profile having mateable portions is extruded onto a web. Defects may occur when the zipper profile is extruded onto the web in a misaligned fashion, or when the mateable portions are not fully mated together (disconnected). Detecting such defects may be difficult to see with the naked eye. A defective web identification system is used to identify the defect of the zipper profile extruded onto the web.

SUMMARY

In one aspect of the present invention, a system that indicates when a defective zipper profile is extruded onto a generally flat plastic web moving in a feed direction in a re-sealable container production line is disclosed. The system generally comprises, a sensing device for detecting the defective zipper profile. A web distortion device in communication with said sensing device can deform the generally flat web during the production in response to the sensing device detecting the defective zipper profile.

In another aspect, a system for indicating when a defective zipper profile is extruded onto a generally flat plastic web moving in a feed direction in a re-sealable container production line generally comprises a sensing device for detecting the defective zipper profile. A web distortion device in communication with the sensing device is capable of deforming the generally flat web during the production in response to the sensing device detecting the defective zipper profile. The web distortion device comprises a support and opposing pusher members connected to the support and defining a space therebetween for the web to pass. The pusher members are movable relative to the support between a noninterfering position when the sensing device does not detect a defective zipper profile and an interfering position when the sensing device detects a defective zipper profile. The pusher members are configured in the noninterfering position to allow the web to travel in the feed direction uninhibited and are configured in the interfering position to distort the web from its generally flat configuration. A roll supporting device is positioned with respect to the web distortion device so that deformed sections of the web remain deformed as they move onto said roll supporting device, and the segment of the web containing the defective zipper profile is conspicuous on the roll.

In yet another aspect, a method that indicates when a defective zipper profile is extruded onto a generally flat plastic web moving in a feed direction in a re-sealable container production line is disclosed. The method generally comprises, detecting the defective zipper profile. The generally flat web is deformed over a segment of the web during the production in response to detecting the defective zipper profile. The deformed web segment is spooled onto a roll supported by a roll support. The deformed web is then removed from the roll.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Plastic bags or other containers may include a re-sealable zipper for opening and closing the bag. This allows repeated access to the interior of the bag, while each time allowing the bag to be sealed with a substantially air-tight seal each time. Plastic bags are generally made from a polyethylene based plastic formed or molded into a generally flat plastic film or web 12. For typical production purposes, a web of plastic may have a width, W, of about twelve to forty-eight inches; a thickness of about 1 Mil-3 Mil; and a length of about four thousand to seven thousand feet for spooling into a roll. In the illustrated embodiment, the web includes a width W of twenty-three inches, a thickness of 1.75 Mil, and a length of five thousand and five hundred feet. Other material characteristics and dimensions of the web can be used without departing from the scope of the present disclosure.

During the production of the plastic bag, a zipper profile is extruded on a web of film. A ridge and associating interlocking grove together form the zipper profile that is extruded onto the web during production. Once production is completed and the bag is formed, the ridge and associating interlocking groove allow the user to open and close the bag as they please.

Figure 3:
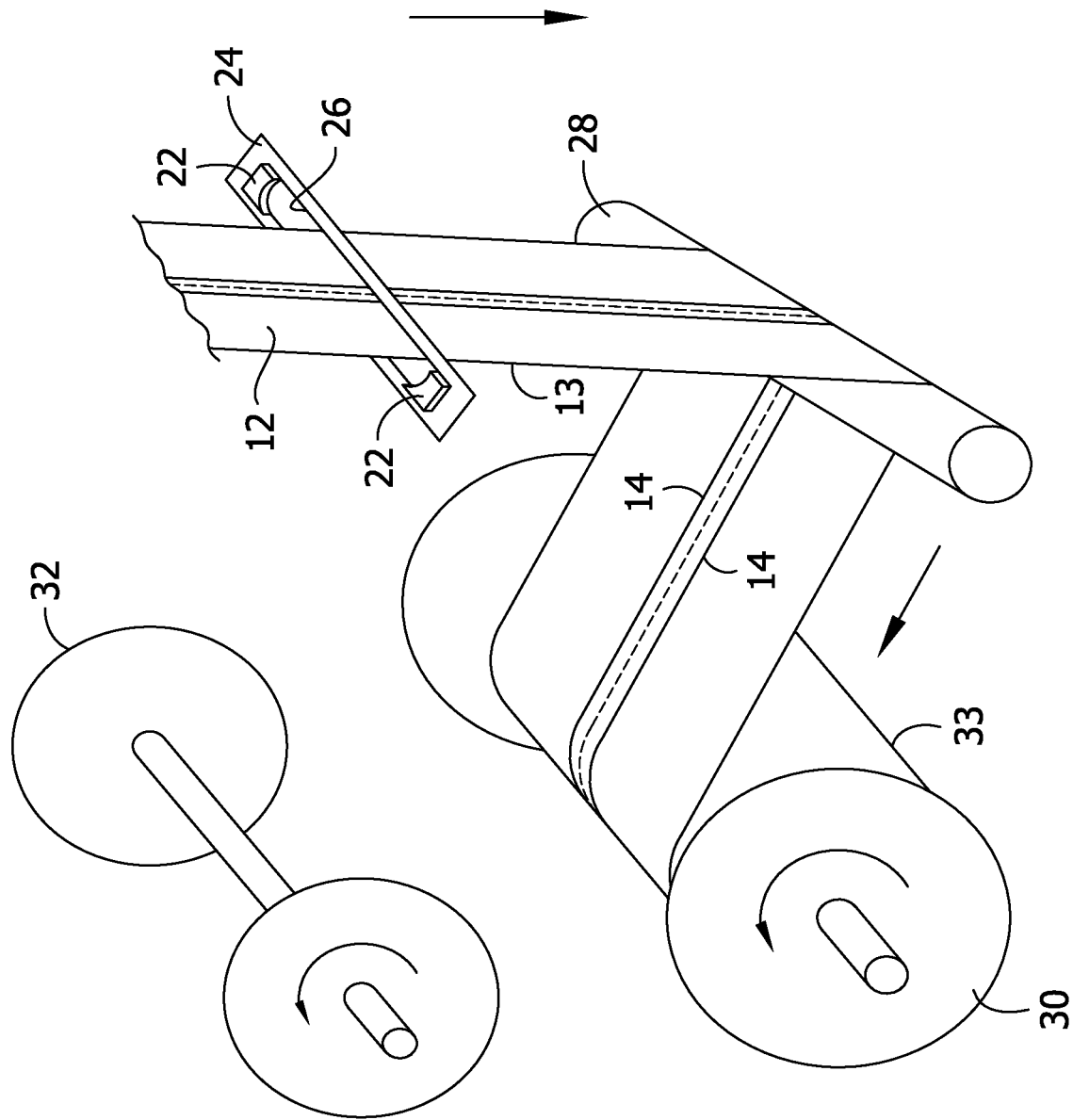
FIG. 3 is a schematic illustration of an un-deformed web spooling on a roll support device downstream.

Referring now to FIG. 3, a portion of a bag production line is schematically illustrated. In the production line, the web 12 moves in a feed direction. Upstream from the portion of the production line shown in FIG. 3 is additional processing equipment. In particular, there is equipment that extrudes two zipper profiles symmetrically onto the web 12 on each side of a longitudinal axis at the center of the web. A single zipper profile extruded onto a web is not outside the scope of this disclosure. Moreover, a zipper profile may be located at a point closer to the edge of the web. The zipper profiles are extruded onto the web using an extrusion process as known to those of skill in the art. In the illustrated embodiment, the web stays generally flat (see, FIG. 3) relative to the width of the web so that the web will spool into a roll in a generally flat, or un-bunched manner, suitable for another point in production (e.g. cutting, sealing, etc.). The web extends around rollers, but remains flat for purposes of the present description. As described hereinafter, the web is generally flat, but some minor deviations are so considered to be flat. As illustrated, the web with the extruded zipper profiles extends around a roller 28 and onto roll support device 30. Roll support device 30 supports a roll of the web with extruded zipper profiles already produced.

Figure 1:
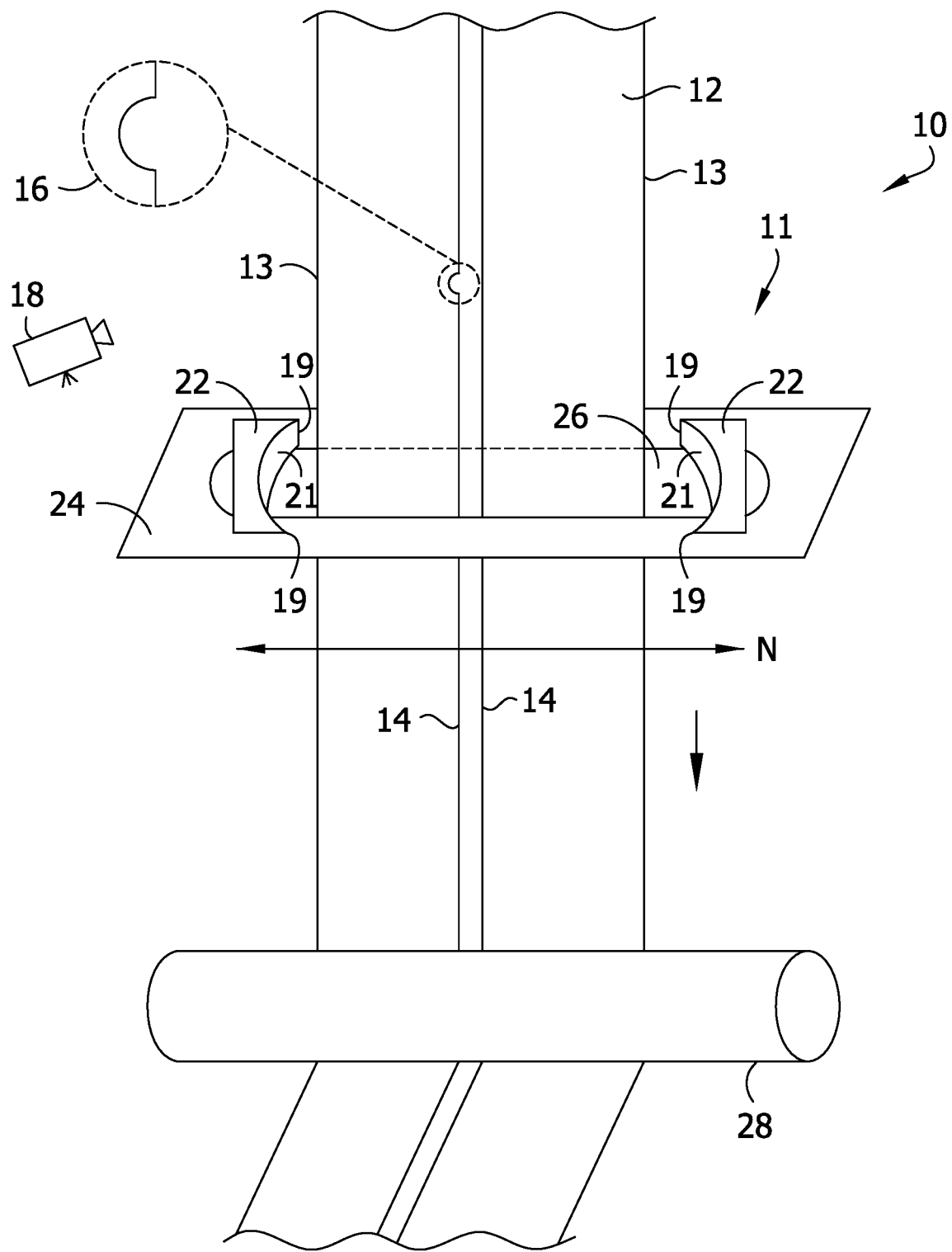
FIG. 1 is a schematic illustration of a generally flat plastic web moving through a production line before detecting a defective zipper profile.

A defect may arise in at least two instances; a misaligned zipper profile extruded onto the web, and a disconnected zipper profile portion extruded onto the web. For purposes of this disclosure, it will be understood the term "defect" may be used when referencing a misaligned zipper profile; or a disconnected zipper profile; or both a misaligned and a disconnected zipper profile, or any other detectable defect that makes the zipper profile unsuitable for its intended purpose. The portion of the web containing the misalignment is not suitable for further production and needs to be removed from the moving web so that the portion containing the misalignment is not spooled into the roll. FIG. 1 illustrates (in a highly schematic manner), the presence of such a discrete misalignment at reference numeral 16. Similarly, there are instances when the ridge and associating interlocking channel are inadvertently not fully mated (closed) together when extruded onto the web. A disconnected zipper profile portion is the result of the ridge and associating interlocking channel not being fully mated together. The portion of the web containing the disconnected zipper profile portion is not suitable for further production and needs to be removed from the moving web so that the portion containing the disconnected zipper profile portion is not used in the final product (e.g., a re-sealable plastic bag).

However, it is very difficult to tell upon simple optical inspection what portions of the web include the defect. A system for detecting and indicating to a production line worker that such a defect has occurred is indicated generally by the reference numeral 10. The system may include a web distortion device 11 and a sensing device 18. As will be described in greater detail, the web distortion device 11 can be used to identify the portion of the web 12 that contains the defect in a way that is easily discerned and markedly apparent to a production line worker that the defect is present in the distorted portion of the web. In the illustrated embodiment, the web distortion device 11 includes opposing pusher members 22 mounted on a support 24 for movement relative to the support. The pusher members 22 are arranged so that a generally flat web 12 passes through the space between the pusher members in a non-interfering manner. It will be understood that the web is in continuous motion as the web distortion device 11 operates.

Figure 4:
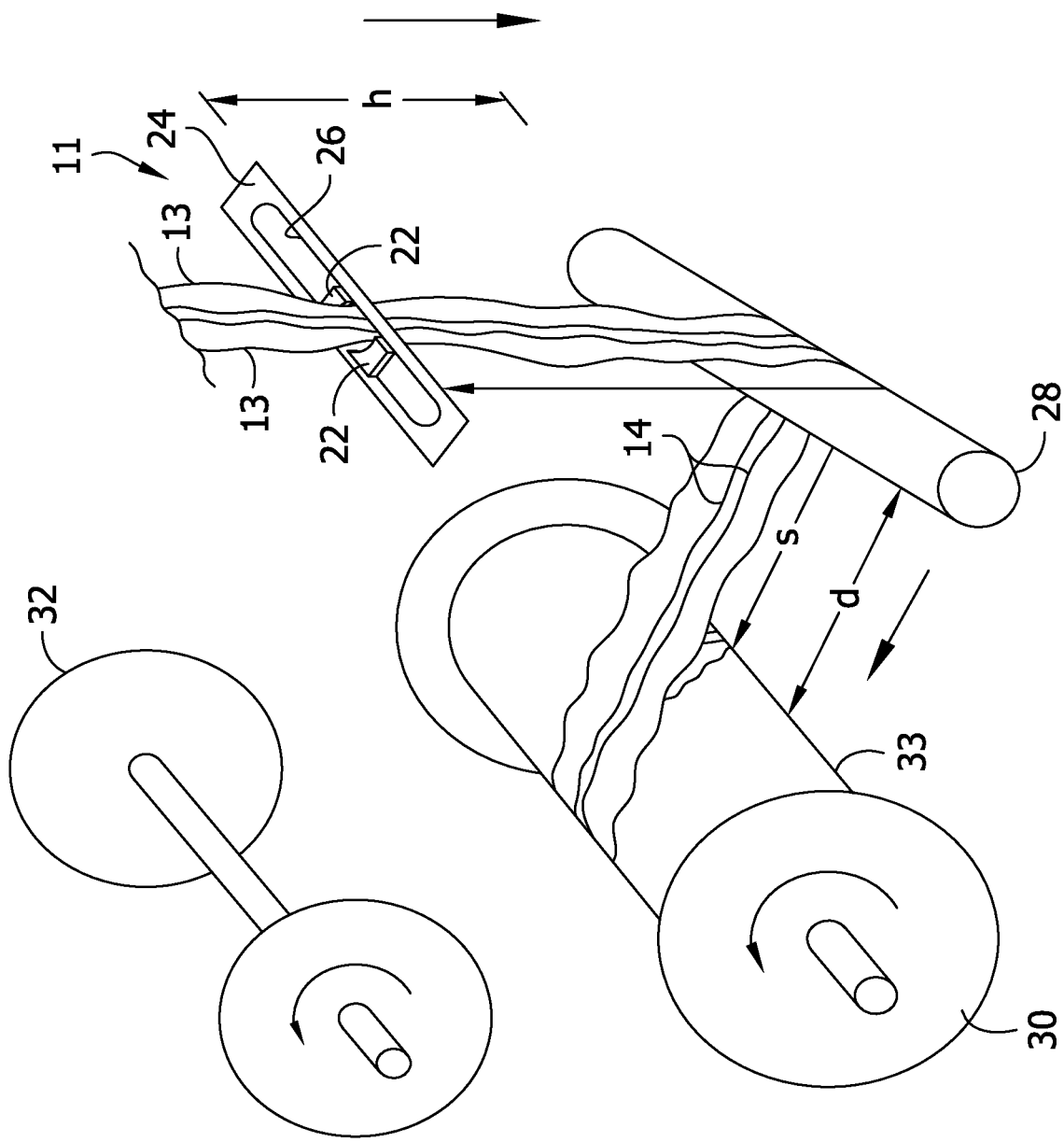
FIG. 4 is a schematic illustration of a segment of deformed web spooling on a support device downstream.

Referring to FIGS. 1-5, the web distortion device 11 is located at a location in the production line upstream the roll support device 30. As shown in FIG. 4, the web distortion device 11 is located at a distance "h" from the roller 28. In the illustrated embodiment, distance "h" is about three to four feet. The support 24 defines an opening 26, the opening 26 is sized and shaped so that the width of the generally flat web can pass through the opening without being interfered. In the illustrated embodiment, the opening is generally an oval or stadium shape The web distortion device 11 comprises opposing pusher members 22 that are slidably mounted to the support 24 for sliding across the opening 26. The opposing pusher members 22 are configured force longitudinal edges 13 of the web 12 closer to each other, which may result in arbitrary points of the generally flat web 12 coming into contact with each other as the web feeds through the opening 26 of the support 24. It may be said that the web 12 is bunched when the pusher members 22 act upon the web.

Referring to FIG. 1, the pusher members 22 are in a noninterfering position where "N" is the distance between the opposing pusher members 22. Distance "N" is greater than the width of the web W, allowing the generally flat web 12 to travel between the opposing pusher members 22 without interference. In the illustrated embodiment, distance "N" is twenty-seven inches so to provide clearance for the web to pass uninhibited therethrough. Of course, in practice the value of N would depend upon the width of the web being processed. In the noninterfering position, each pusher member 22 is two inches from the respective web edge 13 of the generally flat web 12 for feeding through the opening 26. The pusher members 22 include a curved interior surface 21 for engaging the edges of the web 13. In the illustrated embodiment, the curved interior surface 21 includes a radius of two inches. Other dimensions and shapes of the described pusher members are not outside the scope of this disclosure.

Figure 2:
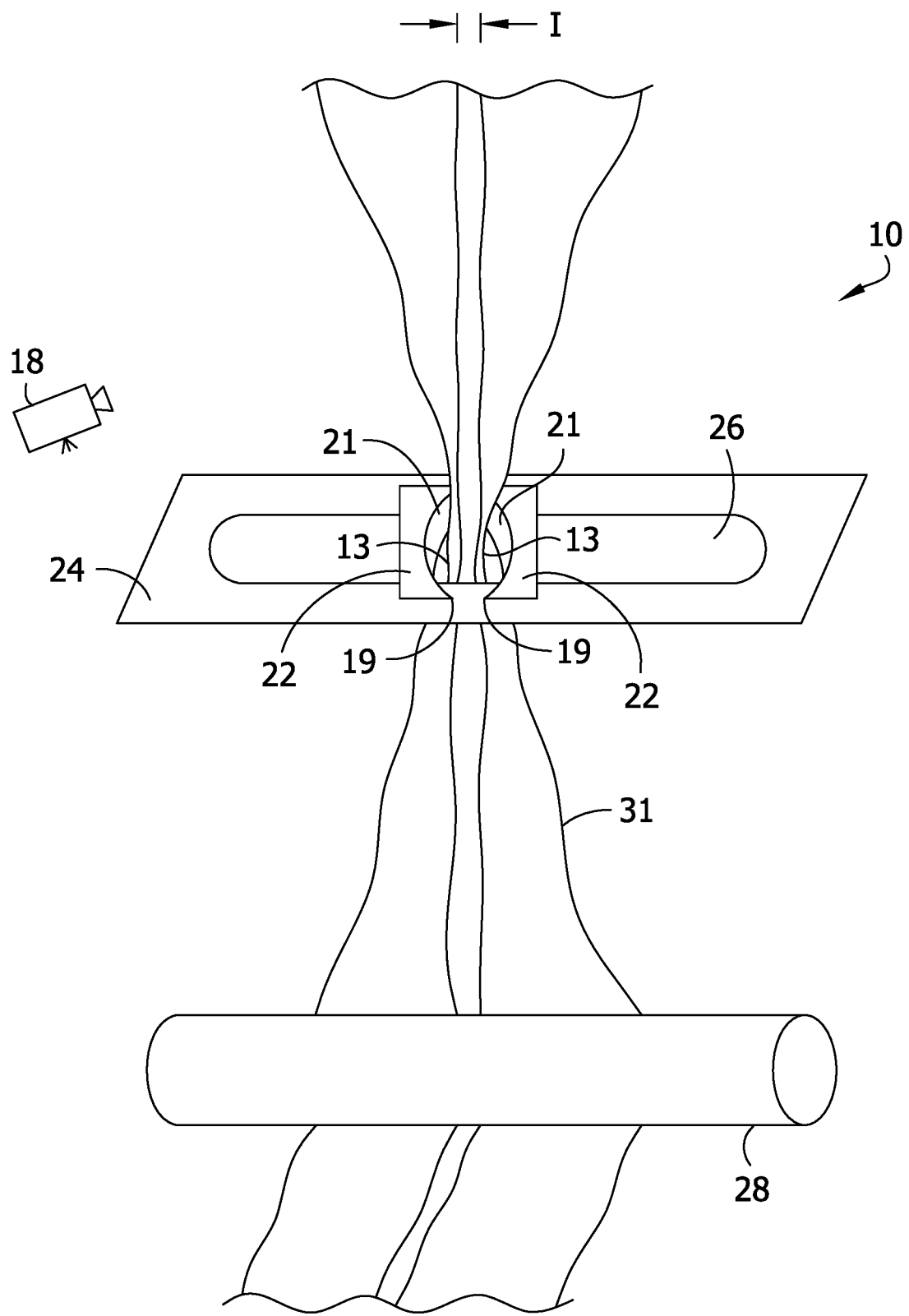
FIG. 2 is a schematic illustration of a generally deformed web moving through the production line in response to detecting a defective zipper profile.

Referring to FIG. 2, the pusher members 22 are in an interfering position where "I" is the distance between the opposing pusher members. Movement of the pusher members 22 between the noninterfering and interfering positions can be driven by one or more solenoids or other suitable actuators. Distance "I" is a distance less than the noninterfering width N and less than the width of the web W. The pusher members 22 gradually decrease the width of the web 12 as the opposing pusher members come together. For example, in the illustrated embodiment, distance "I" ranges from just under twenty-three inches, the undistorted width of the web, to zero, when the outer edges 19 of the pusher members 22 contact each other. FIG. 2 illustrates the pusher members in the interfering position which forms a generally circular constriction space that defines the opening 26. The constriction space includes a diameter sufficiently wide so that the distorted web can continuously pass through the constriction space, in the illustrated embodiment, the diameter of the constriction space is about four inches. Upon receiving a command from a controller the interior curved surfaces 21 of the opposing pusher members 22 work in combination with the sides of the opening 26 to push the web edges 13 together (see, FIGS. 2 and 4). The opposing pusher members 22 come together to entrap and contort the generally flat web 12 into a web that is bunched together (see, FIGS. 2 and 4). In another embodiment, one pusher member may remain stationary while the opposite pusher member moves toward the stationary member so to push the edges of the web together. The bunched web portion 31 continuously passes through the constriction space for a duration of time sufficient for the pusher members 22 remain in the interfering position. Such continuous pass through allows the web to remain bunched together as it spools into a roll 33 on the roller support device 30 downstream.

A sensing device 18 is in communication with the web distortion device 11. In one embodiment, the sensing device 18 comprises an optical scanner for detecting defects. Upon sensing a defect, the sensing device 18 sends instructions to the controller which includes a tangible storage medium for storing the instructions. The controller sends the instructions to the web distortion device 11 which is then activated, as described above. The sensing device 18 and pusher members 22 are configured such that upon the sensing device detecting the defect, the pusher members are activated to distort the web 12 at substantially the same time. In one embodiment, the sensing device 18 detects the defect just prior to the defective portion passing between the pusher members. The pusher members 22 are actuated to return to their noninterfering position once the sensing device 18 detects that the web is free of defects. Movement of the pusher members 22 can be coordinated (i.e., delayed) as necessary to make certain that the last portion of the misaligned zipper profiles is included in the distorted or bunched segment of the web 12.

Referring to FIGS. 1-5, the roll support device 30 is positioned at a location downstream the web distortion device 11. The roller 28 is located between the web distortion device 11 and the roll support device 30. As illustrated in FIG. 4, the roller 28 is spaced a distance "d" from the roll support device 30. Segment length "S" is a section length of the web spanning from the web distortion device 11, around the roller 28, and to the roll support device 30; such that "S" is equal to "d" plus "h." The roll support device 30 is supported for rotation in pillow block bearings 35 within a roll support frame 34. However, other rotatable support devices may be used without departing from the scope of this disclosure. In the illustrated embodiment, the roll support device 30 rotates counter-clock-wise. However, a roll support device may be configured to rotate clockwise for spooling the web. The roll support device 30 may be assisted with a motor for rotating the device to facilitate spooling the web. The distances "h," "d," and "S," are selected so that the web 12 will remain bunched when it reaches the roll support device. As a result, the bunched segment of the web 12 will remain readily apparent to the production line worker when it is in the roll supported by the roll support device 30.

Figure 5:
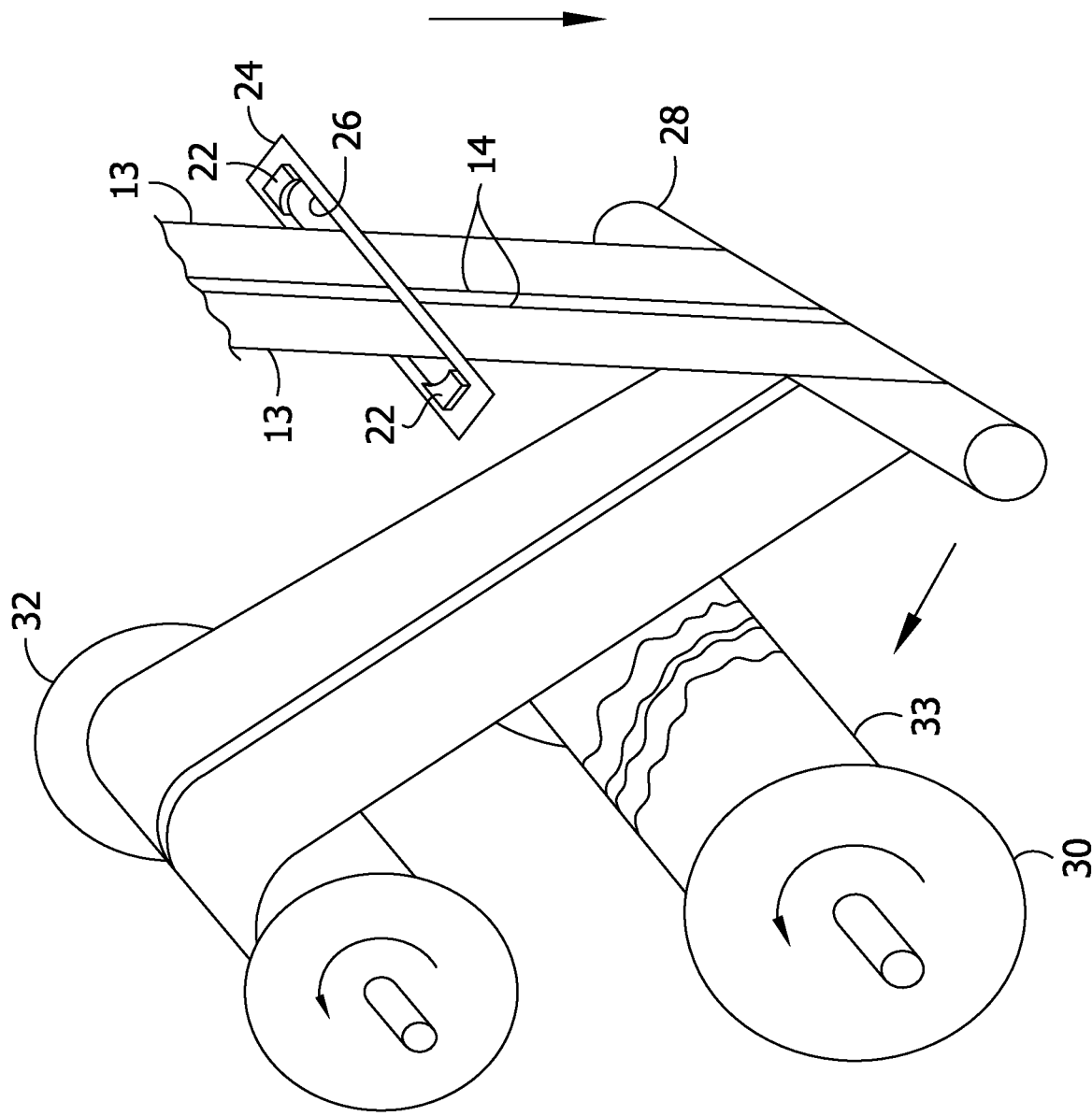
FIG. 5 is a schematic illustration of a non-deformed web placed on an empty roll support device upstream.

Additionally, an empty roll support device 32 is similarly supported for rotation in pillow block bearings 35 within the roll support frame 34 and idly rotates while the lower roll support device 30 spools the bunched web portion 31 into a roll 33. The idly rotating roll support device 32 is powered by a motor. FIGS. 3-5 illustrate an embodiment where the empty roll support device 32 is located above the active roll support device 30 for quick and easy access. Such a location allows a line worker to remove (e.g. with a scissor) the bunched web portion that contains the defect as it moves in the direction of the feed-line After removing the bunched portion, the worker may then place the end of the moving web onto the empty roll device 32. In turn, the upper/empty roll support device 32 begins spooling the web. Once the lower roll support device 30 is removed from the roll support frame 34, a new empty roll support device may be rotatably mounted in its place. Such a system allows for one roll support device to continuously remain spooling the web while the other continuously remains idly empty.

The roller 28 is located at a location between the web distortion device 11 and the roll support frame 34. The roller 28 is positioned as such to keep the web taught, or without slack, and to angle the web at an angle conducive to spooling onto the roll support device 30 (see, FIG. 4). The roller 28 is supported for rotation in pillow block bearings and may be assisted by a motor to facilitate the feed rate of the web 12. It is not outside the scope of this disclosure to have a roller or series of rollers configured to keep the web taught before spooling onto a roll support device.

A method according to the present disclosure for indicating when a defective zipper profile extruded on a generally flat plastic web 12 moving in a feed direction generally comprises the steps of detecting a defect in the zipper profile; deforming a segment of the generally flat web containing the defected zipper profile; spooling the deformed web segment into a nearby roll, and removing said deformed web from the roller. The detecting step is performed in an automated manner by a sensing device as described above. The deforming step is performed in response to the detecting step using a web distortion device as described above. In the illustrated embodiment, the deforming step further comprises bunching the web so to render it readily apparent to a user that a defected zipper profile is contained within the bunched segment. However, it is not outside the scope of this invention to incorporate other deforming methods to perform the deforming step; such as, wrinkling the web, slicing the web, or stretching the web, so as to render it readily apparent that a defected zipper profile lies therein. The spooling step is performed using rollers supported by support bearings. In one embodiment, a motor may be used to assist in the spooling step. In the illustrated embodiment, the web is spooled into a roll that is mounted on a roller support device. The removing step further comprises a user, generally a line worker, cutting the moving web width-wise to stop/halt the spooling onto that roll. The removing step further includes removing the bunched portion from the roll, thereby freeing the roll of any portion including defective zipper profile. The method further includes attaching the web onto an empty roll support device upstream, wherein spooling can begin again. The attaching step is performed by the user.

A defected zipper profile extruded onto a web may prove difficult to see with the naked eye. To make it readily apparent when the web contains a defective zipper profile, a web distortion device contorts the web from its ordinary configuration to one that is readily discernable to a line worker. The illustrated embodiment shows the web bunched together by introducing folds that cause arbitrary points of the web to come in contact with each other. In other embodiments, the defective zipper profile may be readily apparent by putting a wrinkle in the web, slicing the web, or stretching the web, as a way of deforming the generally flat configuration of the web as it is spooled into a roll that is mounted on a roll support device downstream.

As various changes could be made in the above products and methods without departing from the scope of the disclosure, it is intended that all matter contained in the above description shall be interpreted as illustrative and not in a limiting sense.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

It is referred to herein that "downstream" is a direction in the feed direction and "upstream" is in a direction opposite the feed direction.

What is claimed is:

1. A system for indicating when a defective zipper profile is extruded onto a generally flat plastic web moving in a feed direction in a re-sealable container production line, the system for indicating the defective zipper profile comprising: a sensing device for detecting the defective zipper profile; a web distortion device in communication with said sensing device for deforming the generally flat plastic web during a production of a re-sealable container in response to the sensing device detecting the defective zipper profile.

2. The system for indicating the defective zipper profile of claim 1, wherein the web distortion device is configured to contort the generally flat plastic web.

3. The system for indicating the defective zipper profile of claim 1, wherein the web distortion device is configured to bunch up the generally flat plastic web.

4. The system for indicating the defective zipper profile of claim 1, wherein a misaligned zipper profile is a defect detected.

5. The system for indicating the defective zipper profile of claim 1, wherein a disconnected zipper profile portion is a defect detected.

6. The system for indicating the defective zipper profile of claim 5, wherein the defective zipper profile further comprises a first mating portion and an associating second mating portion.

7. The system for indicating the defective zipper profile of claim 6, wherein the disconnected zipper profile portion occurs when the first mating portion and the associating second mating portion remain unmated.

8. The system for indicating the defective zipper profile of claim 1, wherein the web distortion device comprises opposing pusher members configured to receive the generally flat plastic web therebetween.

9. The system for indicating the defective zipper profile of claim 8, wherein the pusher members are movable relative to each other between a noninterfering position and an interfering position.

10. The system for indicating the defective zipper profile of claim 9, wherein the pusher members are configured in the noninterfering position to allow the generally flat plastic web to travel therethrough in its generally flat configuration, and wherein in the interfering position the pusher members are configured to engage and distort the generally flat configuration of the generally flat plastic web.

11. The system for indicating the defective zipper profile of claim 9, wherein each of the pusher members moves from the noninterfering position to the interfering position.

12. The system for indicating the defective zipper profile of claim 10, wherein the pusher members are configured in the interfering position to deform the web by forcing edges of the generally flat plastic web into closer proximity to each other.

13. The system for indicating the defective zipper profile of claim 1, wherein the sensing device comprises an optical scanner.

14. The system for indicating the defective zipper profile of claim 1, further comprising a roll supporting device for receiving and holding a roll of the web, the roll supporting device being located downstream in the feed direction from the web distortion device.

15. The system for indicating the defective zipper profile of claim 14, wherein the roll supporting device is positioned with respect to two pusher members so that deformed sections of the web remain deformed as they move onto said roll supporting device so that a segment of the web containing a defect is conspicuous on the roll supporting device.

16. A system for indicating when a defective zipper profile extruded onto a generally flat plastic web moving in a feed direction in a re-sealable container production line, the system comprising: a sensing device for detecting the defective the zipper profile; a web distortion device in communication with said sensing device for deforming the generally flat plastic web during the production in response to the sensing device detecting the defective zipper profile, the web distortion device comprising a support and opposing pusher members connected to the support and defining a space therebetween for the generally flat plastic web to pass, the pusher members being movable relative to the support between a noninterfering position when the sensing device does not detect the defective zipper profile and an interfering position when the sensing device detects the defective zipper profile, pusher members being configured in the noninterfering position to allow the generally flat plastic web to travel in the feed direction uninhibited and being configured in the interfering position to distort the generally flat plastic web from its generally flat configuration; a roll supporting device positioned with respect to the web distortion device so that deformed sections of the generally flat plastic web remain deformed as they move onto said roll supporting device so that a segment of the generally flat plastic web containing a defect is conspicuous on the roll.

17. The system for indicating the defective zipper profile of claim 16, wherein upon receiving communication from the sensing device to move to the interfering position, the opposing pusher members are configured to engage and deform the generally flat configuration of the generally flat plastic web.

* * * * *